Patented Nov. 12, 1946

2,410,954

UNITED STATES PATENT OFFICE 2,410,954

SILICA MODIFIED CEMENT

James William Sharp, Los Altos, Calif., assignor to Permanente Cement Company, Oakland, Calif., a corporation of California No Drawing. Application October 12, 1944, Serial No. 558,463

6 Claims. (Cl. 106—98)

This invention relates to plastic cements having characteristics useful in mortar, stucco, and the like, and more particularly to Portland and other more or less similar hydraulic cements modified to increase their characteristics useful in plastic cements.

Hydraulic cements are ordinarily used by pouring the grout made therefrom, that is the mixtures of the cement fillers as desired, and water, into forms wherein the mixture is allowed to set. By the term "plastic" is meant that type of cement which forms grouts that can be applied with a trowel or plastered against or onto a backing, without the use of forms. Plastic or mortar cements have been made by intermixing various modifying agents with Portland cements which impart thereto increased adhesiveness, workability and plasticity by virtue of an effect resembling that of lubricant upon the solid particles of the grout. Without such a modifying agent, Portland cement mortars, stuccos, and the like are harsh, stiffen rapidly, and have a high degree of shrinkage and low elasticity.

Definite specifications for masonry mortars, have been laid down by the American Society for Testing Materials. These embrace only the items of compressive strength and flow characteristics of the mortar after suction, in specified apparatus by specified procedure. Plastic cements may have other uses than as mortar or stucco, however, for example for flooring, roofing and in lining irrigation ditches, and the like, without forms, by merely plastering rather than pouring the grout. It may also be desirable to use them by shaping the plastic grout in molds and allowing it to harden therein, due to the flow characteristics thereof which allow greater slump with less water, and their easier molding properties. Further, it may be desirable to use such cements in concrete such as mass concrete and in the construction of ships. Thus, in addition to meeting the specifications referred to above, it may become desirable for a general purpose plastic cement to have the proper degree of working properties, adhesiveness, fatness, plasticity, resistance to deterioration on drying, viscosity, rigidity, elasticity, capillarity, and lack of harshness, flaking tendency and bleeding, and the like.

A very useful plastic cement can be made by intermixing with conventional and special Portland (and other similar hydraulic) cements very reactive amorphous silica ($SiO_2$) in very minute particles, obtained by cooling vapors which form solid silica on cooling. Such silica appears to consist of smaller and more reactive particles the faster the cooling to the solid state, so that fast cooling is ordinarily preferred. It has previously been proposed to add crushed, ground, or powdered silica to Portland cement, but the particles thereof have different characteristics than those of the silica obtained by the quick cooling method described above.

Among other substance proposed for modifying Portland cement to improve the plastic qualities thereof are hydrated lime, calcium or aluminum stearate, paraffin oil with or without calcium chloride, limestone with or without colloidal clay, diatomaceous earth, blast furnace slag with or without hydrated lime, fly ash which is obtained by burning pulverized coal in suspension and contains about 43% silica as silicate, 25% alumina, 15% iron oxide, and some lime, magnesia, carbon, and other constituents. The silica which is formed as described above can be added to the cement either with or without any of the other modifying agents.

The silica useful in this invention can be produced by rapidly condensing solid silica from its vapor state whereby it is obtained in highly subdivided form and in the amorphous state. It may be obtained by subliming crystalline or coarse silica material under suitable temperature conditions or it may be obtained by the vapor phase oxidation of silicon or a lower oxide of silicon, and subsequent condensation of the silica to obtain the product in very small particle size. Preferably, the silica is rapidly condensed from the vapor phase to recover finely divided, amorphous silica.

One convenient method of obtaining the silica useful in this process is to recover that formed in the production of ferrosilicon the latter being a reducing agent which is employed, for example, in the recovery of magnesium metal from its oxygen compounds. The ferrosilicon is usually produced by reacting a siliceous material of coarse of crystalline nature, such as quartz, in an electric arc furnace with iron and a reducing agent such as carbon whereby the quartz is reduced by the carbon and the silicon produced enters into combination with the iron, forming the desired ferrosilicon. In order to obtain an alloy which contains a higher percentage of silicon, for example, 75% of silicon, an excess of quartz is reacted and there is recovered, from the gases passing out of the reaction zone, silica which is amorphous and which is also in a very finely divided state. The mechanism of the formation of this silica has not been fully determined but it may arise in one or more of several ways. The silica which is obtained is recovered by condensation from the vapor state, with recovery of finely divided solid silica. The silica as it exists in the vapor state may, as indicated, arise in several ways; that is to say, some of the original silica may have been vaporized, or it may have been reduced to silicon and the silicon which is vaporized is then reoxidized to silica in the exhaust gas in contact with an oxygen-yielding gas and deposits in the amorphous, finely divided state; or some of the silica may be reduced in the reaction zone to lower oxide of silicon, such as silicon monoxide for example, and this compound then re-oxidized to silica in the issuing vapors when it comes into contact with an oxygen-yielding gas, such as air, silica then depositing in the manner described above. Whatever the mechanism of the reaction, the silica recovered as a deposit from the exhaust gases is in the form of amorphous spherical particles and its physical characteristics are peculiar, as indicated, for example, by its amorphous condition and great degree of subdivision, the particle size averaging about 150 millimicrons in diameter and the particles being predominantly less than 1 micron in diameter. The silica is a dust or very fine flour having a specific surface of about 67,500 square centimeters per gram.

The silica fume can also be produced by reducing quartz, or coarse or crystalline $SiO_2$, with carbon or other suitable reducing agent, treating the vaporous products of the reduction with an oxygen-yielding gas and condensing to give silica in very finely divided form as described above. The vapors containing or forming silica are at high temperatures and can be rapidly cooled by mixing them with a stream of air at atmospheric temperature.

As a result of the peculiar condition in which it exists, it can function as an emulsifying agent to form a stable emulsion of oil in water in a test tube. It analyses 93% (or more) silica with small percentages of iron and aluminum oxides and a trace of magnesium oxide. It can be prepared of greater purity by the cooling method by taking care to avoid any undesired impurities. That produced as a by-product of the ferrosilicon process is effective and is generally preferred.

The silica may be added to the cement in amounts between 3% and 5%, based on the weight of the cement. This is an effective range, although less, or more, may be used. Conventional aggregates may be present also as desired. Bleeding was substantially reduced by the addition of 1%, was visibly negligible with 2%, and appeared to be entirely overcome with 3%. Bleeding in concrete is particularly dangerous in ship construction because water courses are started by the escaping mixing water which might later allow percolation of sea water through the side-walls or bottom of the ship. In general, bleeding and plastic qualities are improved before setting by the use of the described special silica; and after setting the concrete is dense, impervious to water, strong in tension, elastic, and resistant to cracking or crazing, over a wide range of climate and curing conditions.

Portland and other hydraulic cements contain or develop calcium hydroxide in the presence of the mixing water. Due to its fineness and high chemical reactivity, the described special silica combines therewith and improves the characteristics of the cement.

The puzzolanic activity is greatly increased and it is therefore especially advantageous to prepare mass concrete with the addition of the silica as described above. The 90-day compressive strength of a cement prepared in this manner is about 7000 lbs. per square inch as compared with about 5000 lbs. per square inch for ordinary Portland cement.

What is claimed is:

1. Hydraulic cement modified by intermixture therewith of about three to five percent of highly reactive silica in very minute particles obtained by cooling material in the vapor phase which thereby forms silica in the solid phase, said silica being amorphous and consisting predominantly of spherical particles of less than one micron diameter.

2. Portland cement modified by intermixture therewith of about three to five percent of highly reactive silica in very minute particles obtained by cooling material in the vapor phase which thereby forms silica in the solid phase, said silica being amorphous and consisting predominantly of spherical particles of less than one micron diameter.

3. Portland cement modified by intermixture therewith of solid material resulting from cooling of the exhaust vapors when making ferrosilicon, said material consisting principally of amorphous spherical silica particles of less than one micron diameter.

4. Portland cement modified by intermixture therewith of solid material resulting from rapidly cooling of the exhaust vapors when making ferrosilicon, said material consisting principally of amorphous spherical silica particles of less than one micron diameter.

5. Hydraulic cement modified by intermixture therewith of silica dust made by deposition by cooling of material in the vapor phase and having a particle size finer than one micron.

6. Portland cement modified by intermixture therewith of silica dust made by deposition by cooling of material in the vapor phase, the major portion of which has a particle size finer than one micron.

JAMES WILLIAM SHARP.